(12) United States Patent
Lundgren et al.

(10) Patent No.: US 6,444,984 B1
(45) Date of Patent: Sep. 3, 2002

(54) SOLID CRYOGENIC OPTICAL FILTER

(75) Inventors: Mark A. Lundgren, Corona; Carl F. Dadson, Laguna Niguel, both of CA (US)

(73) Assignee: DRS Sensors & Targeting Systems, Inc., Anaheim, CA (US)

( * ) Notice: Subject to any disclaimer, the term of this patent is extended or adjusted under 35 U.S.C. 154(b) by 111 days.

(21) Appl. No.: 09/637,383

(22) Filed: Aug. 11, 2000

(51) Int. Cl.⁷ .................................................. G01J 5/08
(52) U.S. Cl. .............................. 250/339.03; 250/339.01
(58) Field of Search ..................... 250/339.03, 338.1, 250/339.01; 359/586, 589

(56) References Cited

U.S. PATENT DOCUMENTS

| | | |
|---|---|---|
| 3,906,231 A | 9/1975 | Fletcher et al. |
| 3,982,404 A | 9/1976 | Overbye |
| 4,100,760 A | 7/1978 | Cheney |
| 4,127,163 A | 11/1978 | Reti |
| 4,324,285 A | 4/1982 | Henderson |
| 4,396,636 A | 8/1983 | Mitsuda et al. |
| 4,448,524 A | 5/1984 | Brus et al. |
| 4,478,861 A | 10/1984 | Montgomery et al. |
| 4,748,817 A | 6/1988 | Oura et al. |
| 4,829,784 A | 5/1989 | Berg et al. |
| 5,045,703 A | 9/1991 | Wieboldt et al. |
| 5,219,005 A | 6/1993 | Stoffel |
| 5,220,796 A | 6/1993 | Kearns |
| 5,328,517 A | 7/1994 | Cates et al. |
| 5,426,532 A * | 6/1995 | Costich .................. 359/586 |
| 5,459,771 A | 10/1995 | Richardson et al. |
| 5,486,373 A | 1/1996 | Holt et al. |
| 5,514,936 A | 5/1996 | Williamson et al. |
| 5,577,091 A | 11/1996 | Richardson et al. |
| 5,628,831 A | 5/1997 | Williamson et al. |
| 5,696,429 A | 12/1997 | Williamson et al. |
| 5,763,930 A | 6/1998 | Partlo |
| 5,782,253 A | 7/1998 | Cates et al. |
| 5,809,801 A | 9/1998 | Cates, Jr. et al. |
| 5,860,295 A | 1/1999 | Cates, Jr. et al. |
| 5,869,626 A | 2/1999 | Yamamoto et al. |
| 5,964,043 A | 10/1999 | Oughton et al. |

* cited by examiner

*Primary Examiner*—Scott J. Sugarman
*Assistant Examiner*—Richard Hanig
(74) *Attorney, Agent, or Firm*—Norris, McLaughlin & Marcus

(57) ABSTRACT

An optical filter system is described wherein a fluid, such as gaseous phases of water or carbon dioxide, is frozen onto a transmissive substrate positioned in the optical path of an infrared sensor system. The frozen material, which is preferably maintained at cryogenic temperatures, acts as a natural optical filter, absorbing certain undesirable wavelength bands of atmospheric infrared radiation, thus preventing them from reaching the detector of the sensor system. Simultaneously, the optical filter system allows certain desirable wavelength bands of infrared radiation to be transmitted, thus permitting them to reach the detector of the sensor system. The overall effect is to reduce the amount of noise and clutter generated by the undesirable atmospheric infrared radiation from reaching the detector of the sensor system, thus increasing the resolution and effectiveness of the sensor system.

42 Claims, 7 Drawing Sheets

SOLID CRYOGENIC OPTICAL FILTER

GOVERNMENT INTERESTS

This invention was made with government support under Contract No. F04701-96-C-0044, awarded by the United States Air Force to The Boeing Company, and the United States Government has certain rights in this invention.

TECHNICAL FIELD

The present invention relates generally to optical systems, and more particularly to an improved optical system employing at least one fluid which is frozen onto a transmissive substrate positioned in the optical path of a detection system so as to function as an optical filter, thereby absorbing undesirable atmospheric optical radiation emitted from various sources.

BACKGROUND OF THE INVENTION

It is generally known that all objects emit infrared radiation. The temperature of an object determines how much radiation is emitted and at what particular wavelength. The higher a body's temperature, the more radiation emitted and the shorter the peak wavelength of the emissions. As an object's temperature increases, the location of the "peak" wavelength moves toward shorter wavelengths. For example, the surface of the sun, at 60000° K, has its peak in the yellow region of the visible portion of the spectrum, and therefore, appears yellow in the sky. Conversely, a fighter aircraft exhaust, at approximately 800° K, isn't hot enough to emit radiation in the visible spectrum. The fighter aircraft exhaust's peak emission occurs at roughly three micrometers (mm) and is located in the infrared region of the spectrum.

Similar to the colors of the rainbow, the infrared spectrum is divided into subregions primarily based on how they are utilized in sensor systems. The boundaries of these regions are not absolute, but normal convention breaks down the infrared region into four basic categories: Short, Medium, Long and Very Long wavelength. Just beyond the color red in the visible spectrum, i.e., with a wavelength slightly longer than red, is an area known as Short Wavelength Infrared (SWIR). This band generally covers the wavelengths between 1–3 mm and is used by space based sensors to see the bright rocket plumes of boosting missiles. Slightly longer in wavelength and covering from 3–8 mm is the area known as Medium Wavelength Infrared (MWIR). Space systems use this band to detect and track objects through booster burn out against an Earth background [i.e., Below the Horizon (BTH)]. From 8–14 mm, is an area known as Long Wavelength Infrared (LWIR). The long wave band is used by space sensors to see objects Above the Horizon (ATH) against a cold space background. The final region of the infrared, Very Long Wavelength Infrared (VLWIR), is located beyond 14 mm and typically ends around 30 mm. This band is used to track extremely cold targets against a space background.

Because all heated objects emit infrared radiation, the infrared is an excellent spectral region to use for object detection and tracking. Using an infrared detector, an object's emitted radiation can be detected, measured and plotted. Since every object has a unique infrared signature or "fingerprint," a positive object identification can be made based on the received energy.

In order to detect the infrared radiation emitted from heated objects, a material sensitive to infrared radiation is needed. Current space based systems use photon detectors in order to "see" this thermal radiation. Photon detectors consist of a semiconducting material that is sensitive to infrared radiation. The radiation consists of energy packets called "photons" that interact directly with the material and generate electrical signals. The detector material is divided into small sections called "pixels," and a detector's resolution is determined by the size, spacing and number of these pixels. The name given to a material segregated into pixels is a "Sensor Chip Assembly."

Today, most SWIR, MWIR, and IWIR detectors are made of either Mercury-Cadmium-Telluride (HgCdTe) or Indium-Antimonide (InSb); however, Silicon (Si) and Germanium (Ge) are still used for VLWIR detectors.

These infrared sensitive materials can be integrated into a larger device called an "infrared sensor system." An infrared sensor system is a collection of optical elements and electronic hardware connected to an infrared detector. The optical elements reflect and focus incident radiation from an object onto a focal plane, and electronic hardware attached to the focal plane is used to "read out" the electrical signals generated by each pixel of the focal plane. Signal processors are used to convert these analog voltage signals into digital images that can be used by a computer to determine which infrared signature(s) the detector is receiving.

On a space based sensor, each detector collects photons from a particular area on the Earth known as a "footprint." The size of this footprint is determined by the angular field of view of each pixel and the altitude of the sensor. A detector at a high altitude will see a larger area than one at a low altitude; however, a low flying sensor will generally have better resolution.

There are two basic types of sensors—"staring" and "scanning." In a staring sensor, a square or rectangular Focal Plane Array (FPA) continuously looks at a particular area and watches for changes in the incoming infrared radiation over time. The benefit of this technique is that an area is under constant watch, and depending on how often the electronics read out the incident photon energy on the FPA, it is possible to detect small, quick changes in incident radiation intensities. The drawback is that this kind of focal plane generally needs to be large in order to cover a significant area, and these large arrays are more expensive and difficult to build than smaller arrays.

A second technique is to use a smaller array and scan across a region to build a picture of the entire scene. Some common scanning detector methods include the side-to-side toggle scanner, the line scanner or "pushbroom" and the spin scanner or "spinner." The advantage of the scanning sensor is that the FPAs can be manufactured relatively inexpensively compared to large staring sensors while still providing the necessary coverage. The drawback is that as the FPA performs its scanning, it cannot watch an entire scene simultaneously and might miss a change in an event occurring outside its immediate scan area. The speed at which a scanning sensor returns to a particular spot in the field of view is called "revisit rate." If the revisit rate can be made fast enough, a scanning sensor provides a practical alternative to a staring sensor.

The ultimate decision for which type of sensor to use depends on many factors including satellite configuration, mission, altitude and performance requirements.

Infrared sensors are "passive" devices, which means they do not send out and receive signals as do "active" sensors, such as laser or radar sensors. Instead, they passively wait until infrared energy from an object strikes the detector and is measured.

A space based infrared system allows each sensor to view a large area due to its high altitude; however, because satellites are so far away, the infrared radiation needs to travel a great distance in order to reach it, which reduces the amount of radiation received at the detector. In addition, the atmosphere absorbs some infrared radiation at particular wavelengths, thus reducing the amount of radiation reaching the detector even more. To overcome these factors, space based infrared detectors are designed to be very sensitive.

One of the problems in detecting objects through the Earth's atmosphere (or any intervening medium) is the infrared self-emission of the medium itself. This problem is especially significant for both ground- and space-based sensors looking through the atmosphere.

Earth's atmosphere contains significant amounts of water, as well as carbon dioxide. The water and carbon dioxide emit energy (e.g., infrared) in the wavelength band which the detector "sees," causing a large amount of background light (typically referred to as clutter or noise), with a corresponding reduction in image contrast or visibility. This is equivalent to looking through a dense fog and trying to locate a very faint and distant object moving at high speeds.

The standard approach to filtering out unwanted infrared radiation from the Earth's atmosphere is to employ an interference filter placed in the optical path of the sensor system. An interference filter is generally defined as an optical filter that reflects one or more spectral bands or lines and transmits others, while maintaining a nearly zero coefficient of absorption for all wavelengths of interest. An interference filter may be high-pass, low-pass, bandpass, or band-rejection. The interference filter typically consists of multiple layers of dielectric material having different refractive indices. There may also be metallic layers. Interference filters are wavelength-selective by virtue of the interference effects that take place between the incident and reflected waves at the thin-film boundaries.

However, the tighter the requirements on the interference filter, the more layers of dielectrics it needs, with the design becoming much more complicated, harder to manufacture, and potentially more mechanically unstable. Furthermore, these interference filters' properties change with temperature, pressure, and angle. Additionally, complicated interference filters can be very expensive to manufacture and maintain.

Therefore, there exists a need for a system for filtering out all, or substantially all, atmospheric infrared radiation so as to prevent, or at least minimize, detection of same by an infrared sensor system, including ground-and space-based systems, thus increasing the resolution and effectiveness of the infrared sensor system.

BACKGROUND ART

The following U.S. Patents contain information relating generally to the background of the present invention, the entire disclosures of all of which are incorporated herein by reference:

U.S. Pat. No. 3,906,231 issued to Fletcher et al., discloses a superconductive tunneling device having a modified tunnel barrier capable of supporting Josephson tunneling current.

U.S. Pat. No. 3,982,404 issued to Overbye, discloses an I.Q.F. system for deep freezing of food articles and the like.

U.S. Pat. No. 4,100,760 issued to Cheney, discloses loose particulate material to be frozen is supplied to a rising current of refrigerating fluid such as cold air.

U.S. Pat. No. 4,127,163 issued to Reti, discloses a method and apparatus for freezing and subliming uranium hexafluoride ($UF_6$) as part of a gaseous diffusion plant from which a quantity of the $UF_6$ inventory is intermittently withdrawn and frozen to solidify it.

U.S. Pat. No. 4,324,285 issued to Henderson, discloses an apparatus having a high temperature probe and a low temperature probe.

U.S. Pat. No. 4,396,636 issued to Mitsuda et al., discloses a method for producing a frozen-food.

U.S. Pat. No. 4,448,524 issued to Brus et al., discloses an efficient transmission of light through a matrix isolation thin film is obtained despite the fact that the index configuration of the thin film is not appropriate for classical waveguides.

U.S. Pat. No. 4,478,861 issued to Montgomery et al., discloses a mixture of food pieces that are first cooked.

U.S. Pat. No. 4,748,817 issued to Oura et al., discloses a method for the production of microfine frozen particles.

U.S. Pat. No. 4,829,784 issued to Berg et al., discloses a method and system for storing gas, especially an inert gas for electric impulse space drives which use inert gas as a reaction mass.

U.S. Pat. No. 5,045,703 issued to Wieboldt et al., discloses a gas sample collection device and method for cold trapping individual gas bands from a gas source that may include a chromatographic separation and for spectrographically analyzing the individual gas bands.

U.S. Pat. No. 5,219,005 issued to Stoffel, discloses a twin-chamber container which includes an outer plastic container with a valve mounted thereon and an inner collapsible container mounted in communication with the valve.

U.S. Pat. No. 5,220,796 issued to Kearns, discloses a volatile component is recovered from an inert gas blanketed gas source containing the volatile component, an inert carrier gas, water vapor and oxygen as an impurity by a continuous process.

U.S. Pat. No. 5,328,517 issued to Cates et al., discloses a method for removing material from a structure having at least one layer of material formed on a substrate.

U.S. Pat. No. 5,459,771 issued to Richardson et al., discloses a high repetition-rate laser plasma target source system and lithography system.

U.S. Pat. No. 5,486,373 issued to Holt et al., discloses frozen low bulk density dessert or confection products, such as ice confections.

U.S. Pat. No. 5,577,091 issued to Richardson et al., discloses a high repetition-rate laser plasma target source system wherein ice crystals are irradiated by a laser and lithography system.

U.S. Pat. Nos. 5,514,936, 5,628,831 and 5,696,429 issued to Williamson et al., disclose contaminants are cleaned from the surface of a body in space by generating a substantially space-charge neutral reactive plasma, directing the plasma onto the contaminated surface at an energy below the surface sputtering energy, and reacting the plasma with the contaminants to remove them.

U.S. Pat. No. 5,763,930 issued to Partlo, discloses a high energy photon source.

U.S. Pat. No. 5,782,253 issued to Cates et al., discloses a system for removing material from a structure having at least one layer of the material formed on a substrate.

U.S. Pat. Nos. 5,809,801 and 5,860,295 issued to Cates et al., disclose a method and apparatus for accumulation of hyperpolarized $^{129}Xe$.

U.S. Pat. No. 5,869,626 issued to Yamamoto et al., discloses a novel metal-encapsulated fullerene compound wherein a side chain is introduced in a metal-encapsulated fullerene.

U.S. Pat. No. 5,964,043 issued to Oughton et al., discloses a process and apparatus for freeze drying of liquid material in a vessel in which the vessels are moved automatically through various stages.

OBJECTS AND SUMMARY OF THE INVENTION

It is therefore a principal object of this invention to provide a new and improved optical filter.

It is another object of this invention to provide a new and improved infrared optical filter.

It is another object of this invention to provide a new and improved space-based infrared optical filter.

It is another object of this invention to provide a new and improved optical filter.

It is another object of this invention to provide a new and improved infrared optical filter system.

It is another object of this invention to provide a new and improved space-based infrared optical filter system.

It is another object of this invention to provide a new and improved sensor system.

It is another object of this invention to provide a new and improved infrared sensor system.

It is another object of this invention to provide a new and improved space-based infrared sensor system.

In accordance with one embodiment of the present invention, an optical filter is provided, comprising:

a substrate transmissive to infrared radiation, wherein the infrared radiation includes at least two different wavelength bands; and a layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate.

In accordance with another embodiment of the present invention, an optical filter system is provided, comprising:

an optical system for focusing infrared radiation, wherein the infrared radiation includes at least two different wavelength bands;

a substrate transmissive to the infrared radiation; and a layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate.

In accordance with still another embodiment of the present invention, an infrared detection system is provided, comprising:

an optical system for focusing infrared radiation, wherein the infrared radiation includes at least two different wavelength bands;

a substrate transmissive to the infrared radiation;

a layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate; and an infrared radiation sensor system in communication with the transmissive substrate.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference of characters.

DETAILED DESCRIPTION OF THE PREFERRED EMBODIMENTS

Although the present invention is directed primarily to the use of new and improved optical filters, optical filter systems, and infrared detection systems for use in conjunction with space-based applications, it should appreciated that the present invention is equally suitable for practice with ground-based applications, such as astronomical observation systems and the like.

In accordance with the general teachings of the present invention, a filter element or system is located in front of (with respect to incoming optical radiation) a sensor or detector system. It is intended that the filter element or system will absorb (or at least substantially absorb) one or more undesirable wavelength bands of the incoming optical radiation prior to reaching the sensor or detector system. Likewise, it is intended that the filter element or system will not absorb (or at least not substantially absorb) one or more desirable wavelength bands of the incoming optical radiation prior to reaching the sensor or detector system. Thus, the filter element or system will absorb the undesirable wavelength bands of the incoming optical radiation, while transmitting the desirable wavelength bands of the incoming optical radiation. In this manner, the sensor or detector system can be "tuned" to block out only the undesirable wavelengths of optical radiation emitted by a particular medium, thus enhancing visibility, resolution, and effectiveness.

In a preferred embodiment, the primary type of optical radiation that will be absorbed and filtered by the present invention is infrared radiation, although it is envisioned that other types of optical radiation can be absorbed and filtered, as well.

Figure 1:
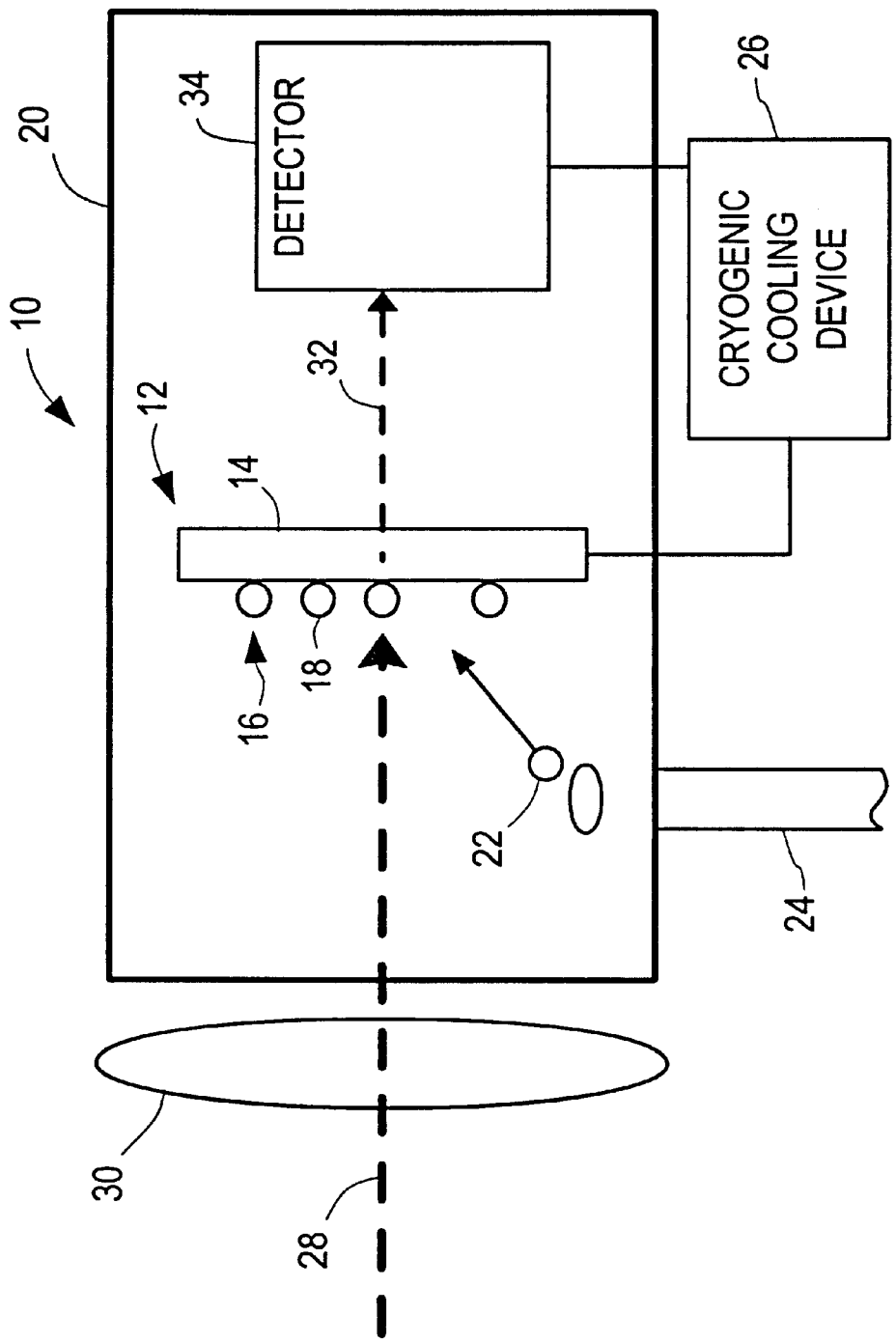
FIG. 1 is a schematic illustration of an illustrative optical filter system, in accordance with one embodiment of the present invention.

Referring to FIG. 1, there is shown an illustrative optical filter system 10 in accordance with one embodiment of the present invention.

At the heart of the system 10 is the optical filter 12 itself, which consists primarily of a transmissive substrate 14 having a layer 16 of frozen gas particles 18 disposed on at least a portion of one of the surfaces of the transmissive substrate 14. It is the layer 16 of frozen gas particles 18 that acts as the filter, as will be explained herein.

Because it is necessary to freeze the gas particles, it is preferable if the optical filter 12 is contained within a sealed or sealable enclosure 20 or compartment in order to maintain a proper temperature or temperature range within the enclosure 20.

The relatively warm gas molecules 22, which can consist of gaseous phases of water, carbon dioxide, as well as other substances, are initially introduced from a source not shown) into the enclosure 20 through a suitable inlet 24 or conduit. Once the gas molecules 22 enter the enclosure 20, they will almost instantly freeze onto the surface of the transmissive substrate 14 due to the fact that the transmissive substrate 14 is cooled by any number of suitable devices, such as a cryogenic cooling device 26, which is in communication with the transmissive substrate 14. An optional mass spectrometer (not shown) or quartz-crystal microbalance (not shown) can be used to control the amount of frozen material deposited onto the transmissive substrate 14.

Once the optical filter 12 is formed, any unfiltered optical radiation 28 which passes through an optical system 30 (e.g., a focusing device, transmissive window, and the like) will then encounter the optical filter 12 of the present invention. Because the optical filter 12 absorbs certain wavelength bands of optical radiation, while permitting certain wavelength bands of optical radiation to be transmitted though the transmissive substrate 14, only filtered optical radiation 32 will be received by the detector system 34, which is preferably in communication with the cryogenic cooling device 26. It is important that the optical filter 12 is positioned in the optical path of the detector system 34; otherwise, undesirable optical radiation would bypass the optical filter 12 and eventually reach the detector system 34, defeating the intended purpose of the present invention.

In this manner, the optical filter 12 of the present invention provides sharper wavelength transmission and absorption characteristics than can be economically produced by a standard interference filter, and without the self-emission which would occur if a warm gas-cell were used as a filter. Additionally, because the optical filter 12 of the present invention does not employ electrolytic materials, and a nuclear tolerant transmissive substrate can be chosen, these filters would not darken with exposure to the space environment.

In practice, many space-based systems are launched "cold," or under cryogenic conditions. Therefore, the optical filter 12 could be frozen in place before launch. If performance degraded in orbit, the optical filter 12 could be "erased" by warming the transmissive substrate 14 (e.g., by de-powering the cryogenic cooling device 26), and a new optical filter 12 could be recast by evacuating the enclosure 20, re-cooling the transmissive substrate 14, then admitting a different amount or mixture of gases into the enclosure 20. Currently, space-based systems have to carry an interference filter that is anticipated or thought to be the best fit, or, alternatively, multiple interference filters must be carried onboard.

Figure 2:
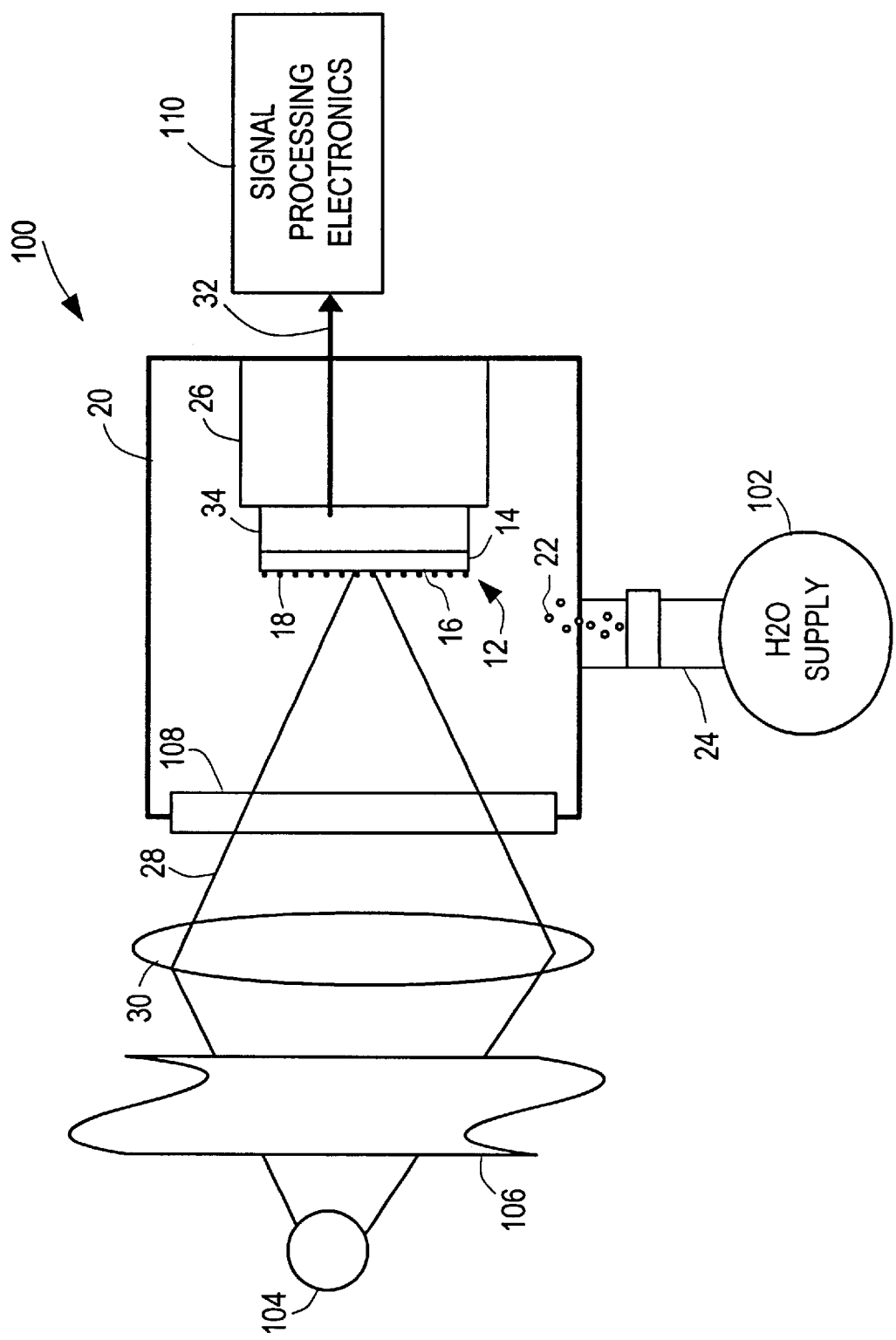
FIG. 2 is a schematic illustration of an illustrative optical filter system, in accordance with another embodiment of the present invention.

Referring to FIG. 2, there is shown an illustrative optical filter system 100 in accordance with another embodiment of the present invention.

Like the system depicted in FIG. 1, the optical filter 12 consists primarily of a transmissive substrate 14 having a layer 16 of frozen gas particles 18 disposed on at least a portion of one of the surfaces of the transmissive substrate 14. Again, the optical filter 12 is contained within a sealed or sealable enclosure 20 in order to maintain a proper temperature range. The relatively warm gas molecules 22, which can consist of gaseous phases of water, carbon dioxide, as well as other substances, are initially introduced from a source 102 into the enclosure 20 through a suitable inlet 24. Once the gas molecules 24 enter the enclosure 20, they will almost instantly freeze onto the surface of the transmissive substrate 14 due to the fact that the transmissive substrate 14 is cooled by a cryogenic cooling device 26 (e.g., a Joule Thompson Cooler). In this embodiment, the transmissive substrate 14 is adjacent to the detector system 34, with the detector system 34 being adjacent to the cryogenic cooling device 26, although other configurations are also envisioned.

Once the optical filter 12 is formed, any unfiltered optical radiation 28 emitted from a target 104 (e.g., a missile), as well as the atmosphere 106 (e.g., water vapor, carbon dioxide vapor), which passes through an optical system 30 (e.g., a focusing device) and then a transmissive window 108 will encounter the optical filter 12 of the present invention. Because the optical filter 12 absorbs certain wavelength bands of optical radiation, while permitting certain wavelength bands of optical radiation to be transmitted though the transmissive substrate 14, only filtered optical radiation 32 will be received by the detector system 34. Again, it is important that the optical filter 12 is positioned in the optical path of the detector system 34, otherwise, undesired optical radiation would bypass the optical filter 12 and eventually reach the detector system 34. Once the detector system 34 receives the filtered optical radiation 32, the data can be transmitted to an optional signal processing system 110 in order to generate data about, and images of, the target 104.

By way of a non-limiting example, one such detector system 34 that can operate in this type of configuration is an InSb detector system, cooled to 80° K.

In order to better understand how the optical filter of the present invention functions, reference is made to FIGS. 3A–4B.

Figure 3A:
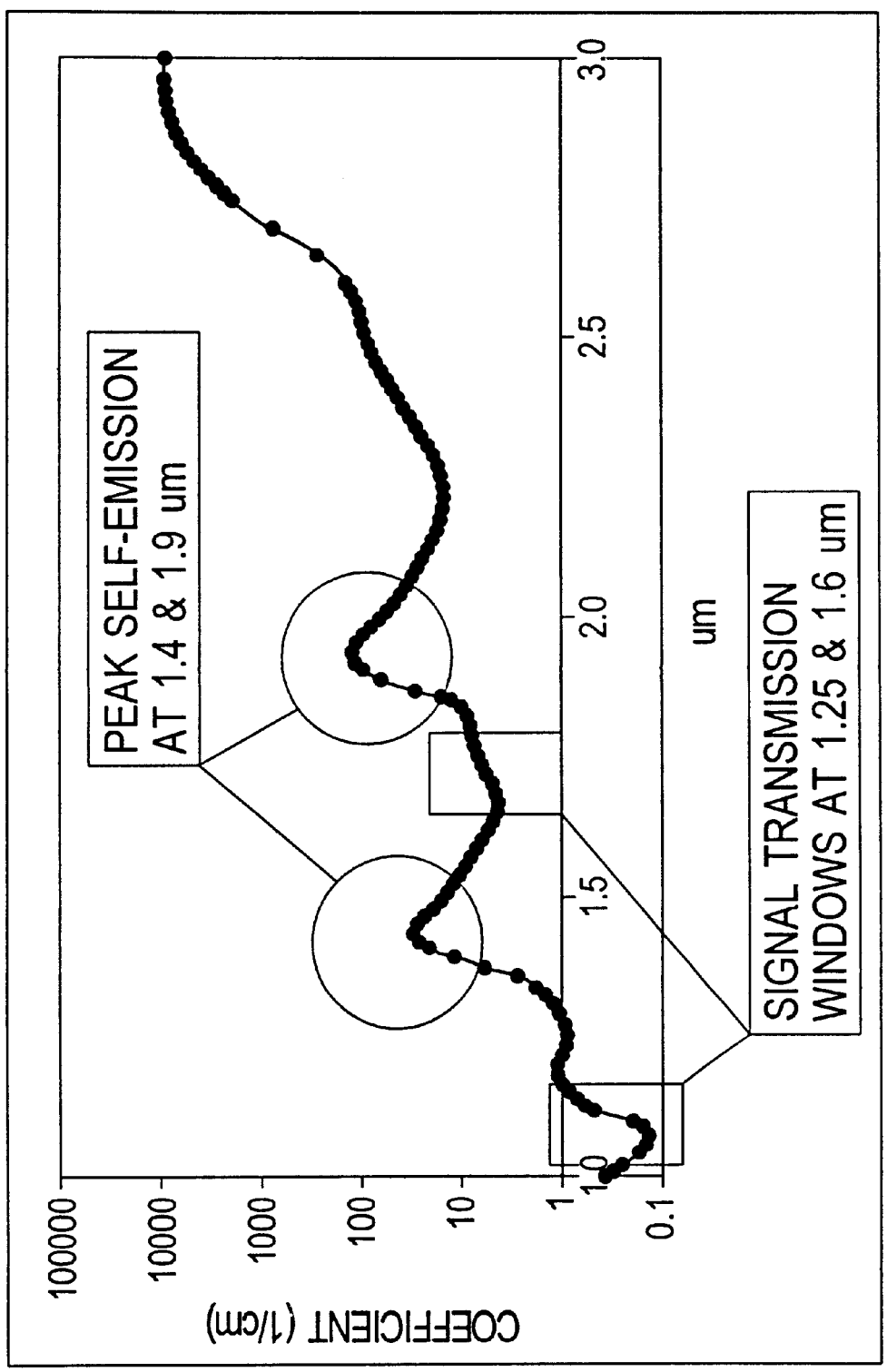
FIG. 3A is a graphical illustration of the emission profile of the liquid phase of water.
Figure 3B:
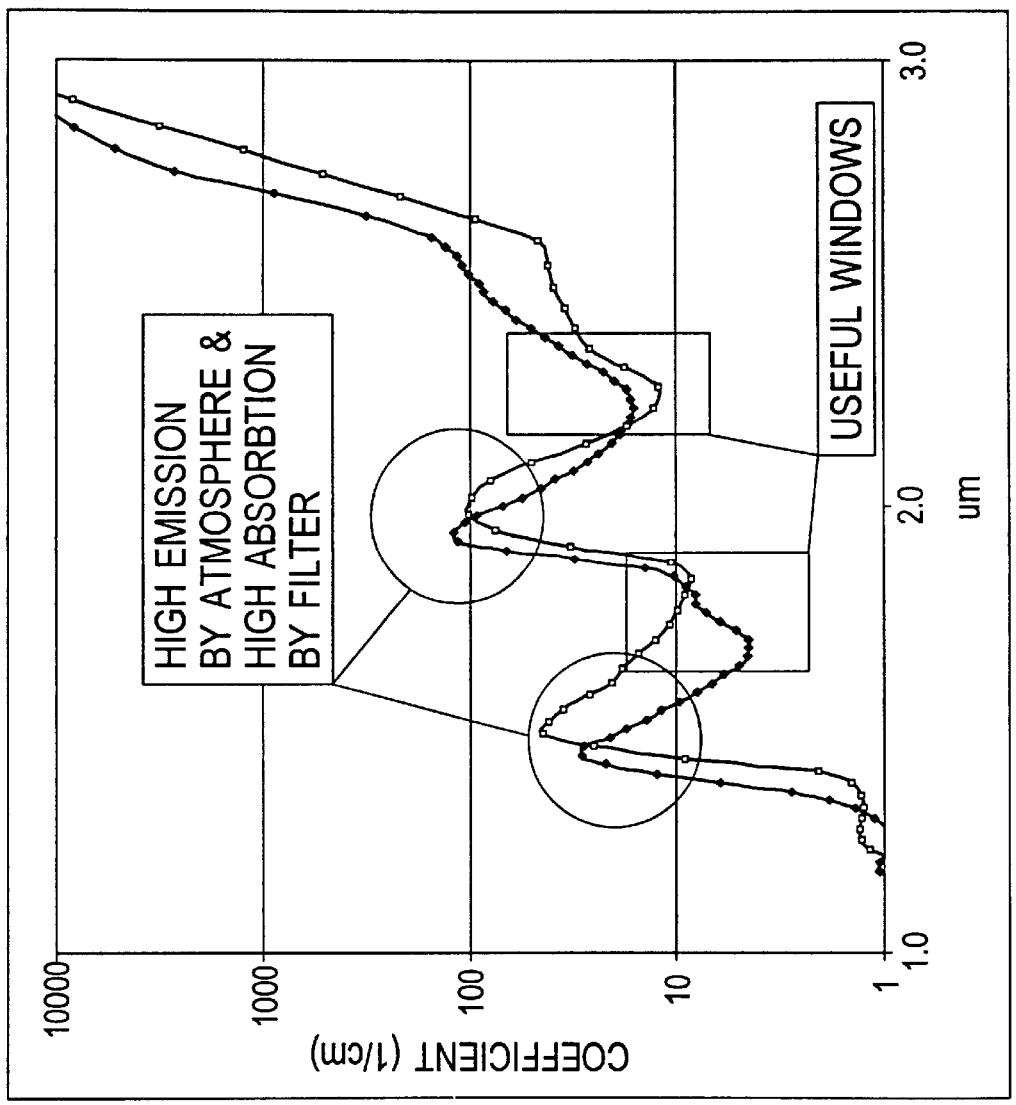
FIG. 3B is a graphical illustration of the emission profile of the gaseous phase of water.

In FIGS. 3A and 3B, the emission profiles of the liquid phase of water and the gaseous phase of water are shown, respectively. It is to be noted that both liquid water and water vapor share similar peak self-emission characteristics (i.e., at around 1.4 and 1.9 $\mu$m), as well as similar signal transmission windows (i.e., at around 1.25 and 1.6 $\mu$m). Thus, if a material could filter out the self-emission peaks that occur at 1.4 and 1.9 $\mu$m, the noise and clutter caused by atmospheric water and water vapor would not hinder the performance of a space- or ground-based infrared detector system. Thus, the detector system could more clearly detect the 1.0–1.4, 1.6–1.8, and 2.2–2.6 $\mu$m wavelength bands of the incoming infrared radiation.

Figure 3C:
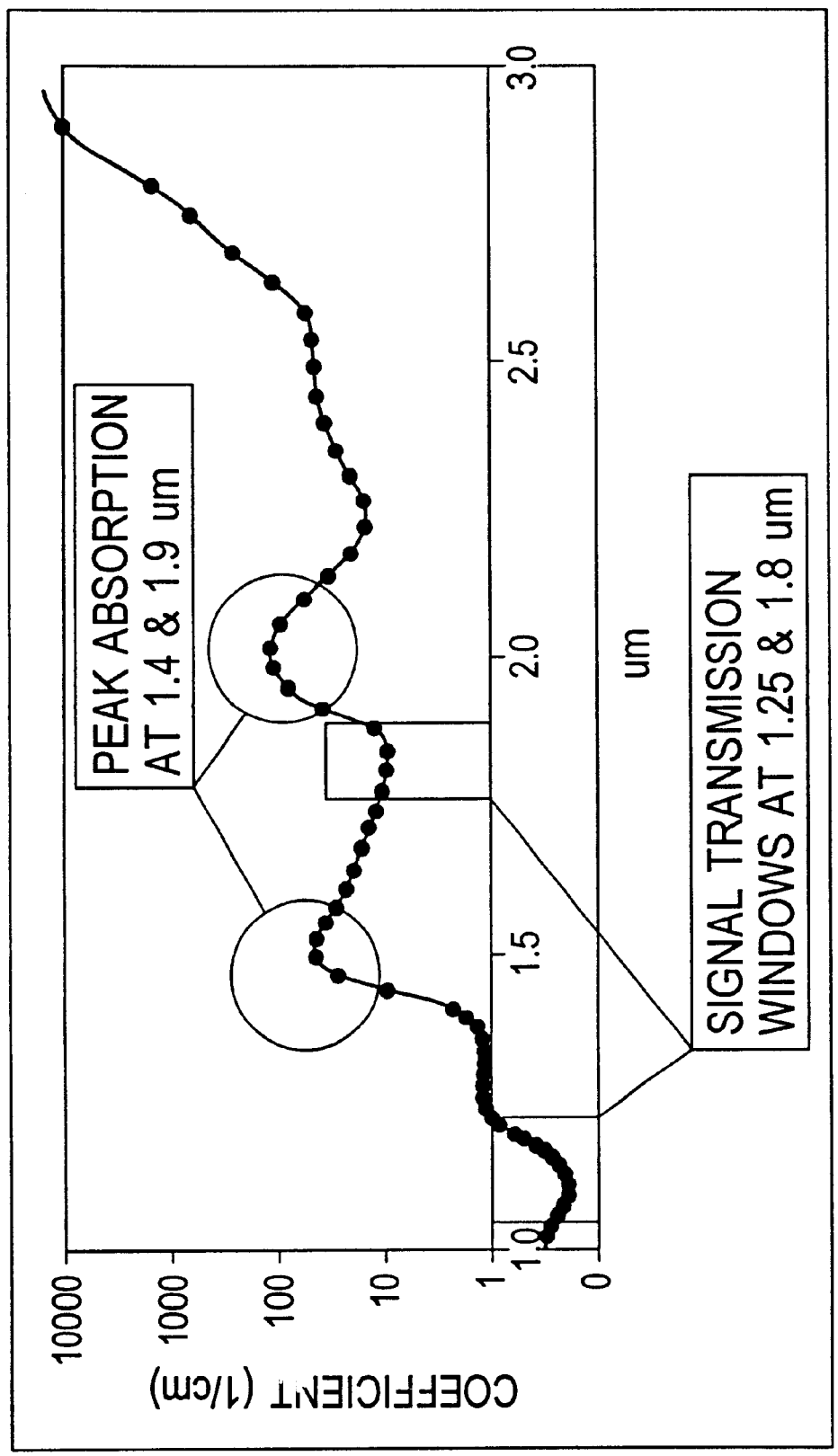
FIG. 3C is a graphical illustration of the absorption profile of the solid phase of water.

With reference to FIG. 3C, the present invention provides such a solution to this problem by discovering that the absorption profile of the solid phase of water (i.e., ice) indicates that solid water has peak absorption at 1.4 and 1.9 $\mu$m, the same approximate wavelengths that correspond to the self-emission peaks of liquid water and water vapor. Furthermore, solid water has signal transmission peaks at around 1.25 and 1.8 $\mu$m, almost the same exact wavelengths that correspond to the signal transmission peaks of liquid water and water vapor. Thus, an optical filter formed by a layer of solid water on a transmissive substrate would appear to provide an ideal means of absorbing the infrared radiation emitted by atmospheric liquid water and water vapor, while permitting other wavelengths bands of infrared radiation to be transmitted. Without being bound to a particular theory of the operation of the present invention, it is believed that ice is a particularly good filter material due to its amorphous structural characteristic, i.e., ice does not have a latticed, crystalline structure. Thus, the optical characteristics of water and water vapor are maintained when either is frozen into ice.

Although the previous description focused on the problem of atmospheric liquid water and water vapor self-emission, it should be noted that the present invention has also addressed the problem of atmospheric carbon dioxide vapor self-emission.

Figure 4A:
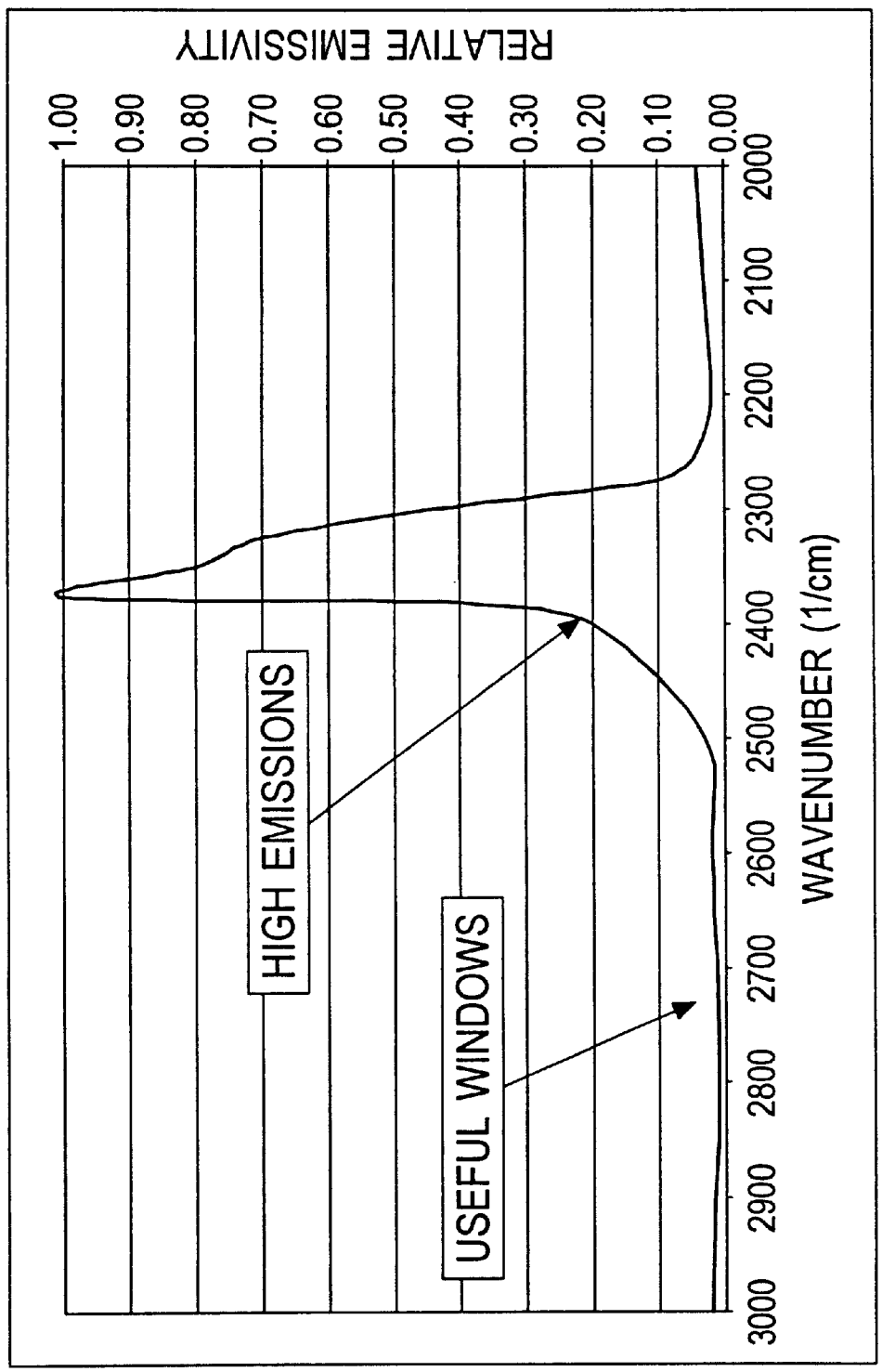
FIG. 4A is a graphical illustration of the emission profile of the gaseous phase of carbon dioxide.

With reference to FIG. 4A, the emission profile of the gaseous phase of carbon dioxide is shown. It is to be noted that carbon dioxide vapor has a self-emission peak at about 2400 cm$^{-1}$. Thus, if a material could filter out the self-emission peak that occurs at about 2400 cm$^{-1}$, the noise and clutter caused by atmospheric carbon dioxide vapor would not hinder the performance of a space- or ground-based infrared detector system.

Figure 4B:
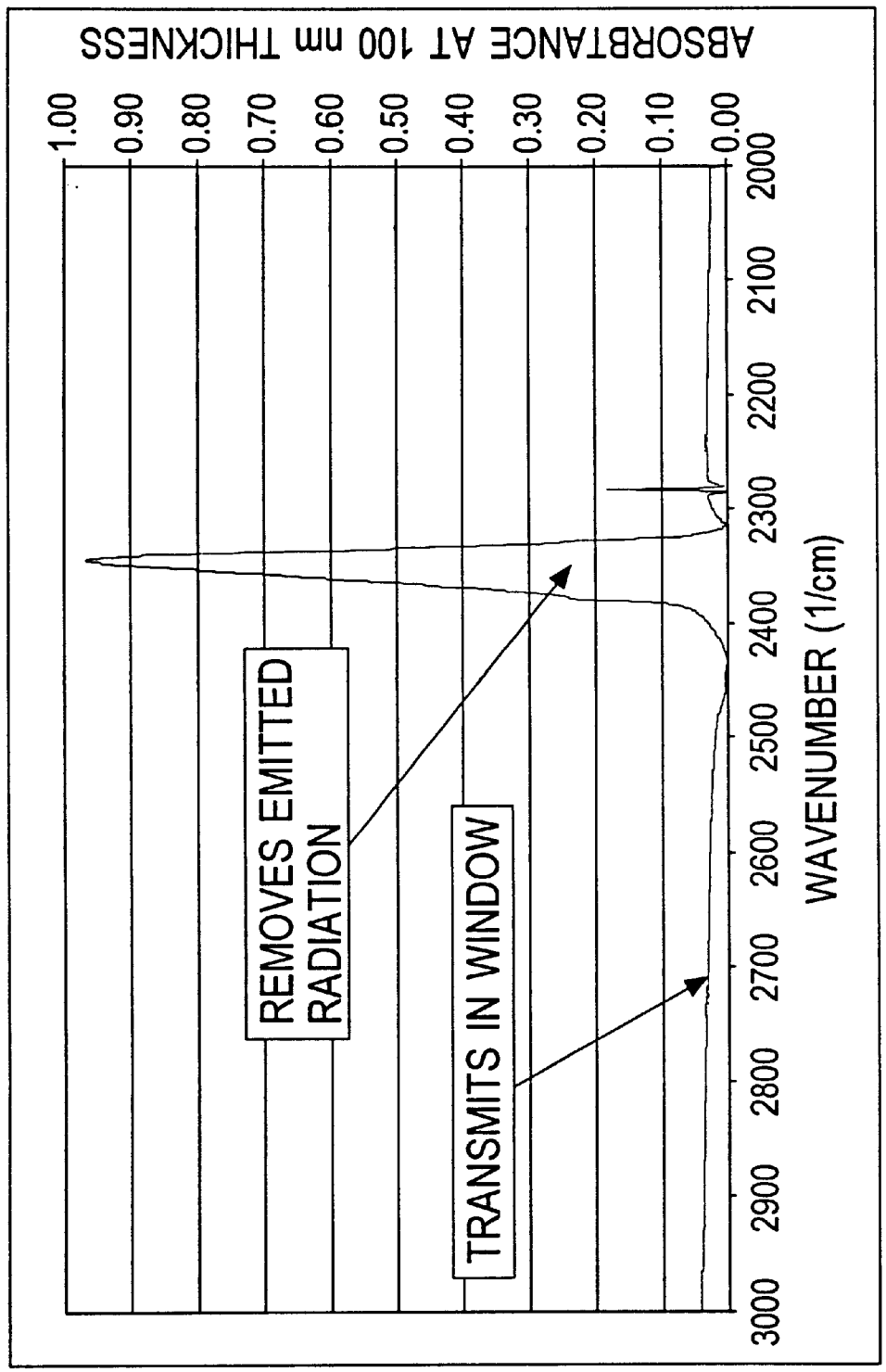
FIG. 4B is a graphical illustration of the emission profile of the solid phase of carbon dioxide.

With reference to FIG. 4B, the present invention provides such a solution to this problem by discovering that the absorption profile of the solid phase of carbon dioxide (i.e., dry ice) indicates that solid carbon dioxide has a peak absorption at about 2400 cm$^{-1}$, the same exact wavelength that corresponds to the self-emission peak of carbon dioxide vapor. Furthermore, solid carbon dioxide has a signal transmission peak at 2700 cm$^{-1}$, the same exact wavelength that corresponds to the signal transmission peak of carbon dioxide vapor. Thus, an optical filter formed by a layer of solid carbon dioxide on a transmissive substrate would appear to provide an ideal means of absorbing the infrared radiation emitted by atmospheric carbon dioxide vapor, while permitting other wavelengths bands of infrared radiation to be transmitted.

It should be noted that multiple gases could be mixed or deposited in alternating layers in order to add absorption capabilities in other wavelength bands; or alternatively, one gas could act as a "catalyst" in the optimal deposition of the desired gas. Additionally, the correct temperature and pressure conditions, measurable with optional temperature and pressure sensors, could be useful in forming the optical filter of the present invention. Furthermore, one of ordinary skill in the art of optics or spectroscopy will be able to select various other single and combination filter materials to be frozen onto the transmissive substrate in order to match the signal transmission peaks of the particular media, with the self-emission peaks being absorbed or filtered.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An optical filter, comprising:
   a substrate transmissive to infrared radiation, wherein the infrared radiation includes at least two different wavelength bands; and
   an erasable layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate.

2. The invention of claim 1, wherein the material permits the transmission of the other of the at least two different wavelength bands of the infrared radiation through the transmissive substrate.

3. The invention of claim 1, wherein the material is introduced in fluid form adjacent to the transmissive substrate and subsequently frozen so as to form the layer of material on the at least a portion of the surface of the transmissive substrate.

4. The invention of claim 3, wherein the fluid is selected from the group consisting of gaseous phases of water, carbon dioxide, and combinations thereof.

5. The invention of claim 1, wherein the material is selected from the group consisting of solid phases of water, carbon dioxide, and combinations thereof.

6. The invention of claim 1, wherein the material is maintained at a cryogenic temperature.

7. The invention of claim 1, wherein the erasable layer of material is erased from the portion of the surface of the transmissive substrate upon exposure to a predetermined environment selected from the group consisting of a predetermined temperature, at predetermined pressure, a predetermined erasing material, and combinations thereof.

8. An optical filter system, comprising:
   an optical system for focusing infrared radiation, wherein the infrared radiation includes at least two different wavelength bands;
   a substrate transmissive to the infrared radiation; and
   an erasable layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate.

9. The invention of claim 8, further comprising an infrared radiation sensor system in communication with the transmissive substrate.

10. The invention of claim 9, further comprising a signal processing system in communication with the infrared radiation sensor system.

11. The invention of claim 8, wherein the material permits the transmission of the other of the at least two different wavelength bands of the infrared radiation through the transmissive substrate.

12. The invention of claim 8, wherein the material is introduced in fluid form adjacent to the transmissive substrate and subsequently frozen so as to form the layer of material on the at least a portion of the surface of the transmissive substrate.

13. The invention of claim 12, wherein the fluid is selected from the group consisting of gaseous phases of water, carbon dioxide, and combinations thereof.

14. The invention of claim 8, wherein the material is selected from the group consisting of solid phases of water, carbon dioxide, and combinations thereof.

15. The invention of claim 8, wherein the material is maintained at a cryogenic temperature.

16. The invention of claim 8, wherein the erasable layer of material is erased from the portion of the surface of the transmissive substrate upon exposure to a predetermined environment selected from the group consisting of a predetermined temperature, a predetermined pressure, a predetermined erasing material, and combinations thereof.

17. An infrared detection system, comprising:
   an optical system for focusing infrared radiation, wherein the infrared radiation includes at least two different wavelength bands;
   a substrate transmissive to the infrared radiation;
   an erasable layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate; and
   an infrared radiation sensor system in communication with the transmissive substrate.

18. The invention of claim 17, further comprising a signal processing system in communication with the infrared radiation sensor system.

19. The invention of claim 17, wherein the material permits the transmission of the other of the at least two different wavelength bands of the infrared radiation through the transmissive substrate.

20. The invention of claim 17, wherein the material is introduced in fluid form adjacent to the transmissive substrate and subsequently frozen so as to form the layer of material on the at least a portion of the surface of the transmissive substrate.

21. The invention of claim 20, wherein the fluid is selected from the group consisting of gaseous phases of water, carbon dioxide, and combinations thereof.

22. The invention of claim 17, wherein the material is selected from the group consisting of solid phases of water, carbon dioxide, and combinations thereof.

23. The invention of claim 17, wherein the material is maintained at a cryogenic temperature.

24. The invention of claim 17, wherein the erasable layer of material is erased from the portion of the surface of the transmissive substrate upon exposure to a predetermined environment selected from the group consisting of a predetermined temperature, a predetermined pressure, a predetermined erasing material, and combinations thereof.

25. An optical filter, comprising:

a substrate transmissive to infrared radiation, wherein the infrared radiation includes at least two different wavelength bands; and a layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate, wherein the material is introduced in fluid form adjacent to the transmissive substrate and subsequently frozen so as to form the layer of material on the at least a portion of the surface of the transmissive substrate.

26. The invention of claim 25, wherein the material permits the transmission of the other of the at least two different wavelength bands of the infrared radiation through the transmissive substrate.

27. The invention of claim 25, wherein the fluid is selected from the group consisting of gaseous phases of water, carbon dioxide, and combinations thereof.

28. The invention of claim 25, wherein the material is selected from the group consisting of solid phases of water, carbon dioxide, and combinations thereof.

29. The invention of claim 25, wherein the material is maintained at a cryogenic temperature.

30. An optical filter system, comprising:

an optical system for focusing infrared radiation, wherein the infrared radiation includes at least two different wavelength bands;

a substrate transmissive to the infrared radiation; and a layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate, wherein the material is introduced in fluid form adjacent to the transmissive substrate and subsequently frozen so as to form the layer of material on the at least a portion of the surface of the transmissive substrate.

31. The invention of claim 30, further comprising an infrared radiation sensor system in communication with the transmissive substrate.

32. The invention of claim 31, further comprising a signal processing system in communication with the infrared radiation sensor system.

33. The invention of claim 30, wherein the material permits the transmission of the other of the at least two different wavelength bands of the infrared radiation through the transmissive substrate.

34. The invention of claim 30, wherein the fluid is selected from the group consisting of gaseous phases of water, carbon dioxide, and combinations thereof.

35. The invention of claim 30, wherein the material is selected from the group consisting of solid phases of water, carbon dioxide, and combinations thereof.

36. The invention of claim 30, wherein the material is maintained at a cryogenic temperature.

37. An infrared detection system, comprising:

an optical system for focusing infrared radiation, wherein the infrared radiation includes at least two different wavelength bands;

a substrate transmissive to the infrared radiation;

a layer of material formed on at least a portion of a surface of the transmissive substrate, wherein the material substantially absorbs at least one of the at least two different wavelength bands of the infrared radiation so as to substantially prevent the transmission of one of the at least two different wavelength bands of the infrared radiation through the transmissive substrate, wherein the material is introduced in fluid form adjacent to the transmissive substrate and subsequently frozen so as to form the layer of material on the at least a portion of the surface of the transmissive substrate; and an infrared radiation sensor system in communication with the transmissive substrate.

38. The invention of claim 37, further comprising a signal processing system in communication with the infrared radiation sensor system.

39. The invention of claim 37, wherein the material permits the transmission of the other of the at least two different wavelength bands of the infrared radiation through the transmissive substrate.

40. The invention of claim 37, wherein the fluid is selected from the group consisting of gaseous phases of water, carbon dioxide, and combinations thereof.

41. The invention of claim 37, wherein the material is selected from the group consisting of solid phases of water, carbon dioxide, and combinations thereof.

42. The invention of claim 37, wherein the material is maintained at a cryogenic temperature.

* * * * *

UNITED STATES PATENT AND TRADEMARK OFFICE
CERTIFICATE OF CORRECTION

PATENT NO. : 6,444,984 B1
DATED : September 3, 2002
INVENTOR(S) : Lundgren et al.

It is certified that error appears in the above-identified patent and that said Letters Patent is hereby corrected as shown below:

Column 1,
Line 32, "(mm)" should read -- ($\mu$m) --.
Lines 43, 45 and 49, "mm" should read -- $\mu$m --.
Line 54, each occurrence of "mm" should read -- $\mu$m --.

Column 9,
Line 65, after "at" insert -- a --.

Signed and Sealed this

Fourth Day of February, 2003

JAMES E. ROGAN
*Director of the United States Patent and Trademark Office*